US011884513B2

(12) United States Patent
Kusserow et al.

(10) Patent No.: US 11,884,513 B2
(45) Date of Patent: Jan. 30, 2024

(54) METHOD AND DEVICE FOR MONITORING OPERATING PARAMETERS IN A PASSENGER TRANSPORT INSTALLATION

(71) Applicant: Inventio AG, Hergiswil (CH)

(72) Inventors: Martin Kusserow, Lucerne (CH); Reto Tschuppert, Lucerne (CH)

(73) Assignee: INVENTIO AG, Hergiswil (CH)

( * ) Notice: Subject to any disclaimer, the term of this patent is extended or adjusted under 35 U.S.C. 154(b) by 1171 days.

(21) Appl. No.: 16/482,317

(22) PCT Filed: Mar. 13, 2018

(86) PCT No.: PCT/EP2018/056130
§ 371 (c)(1),
(2) Date: Jul. 31, 2019

(87) PCT Pub. No.: WO2018/166994
PCT Pub. Date: Sep. 20, 2018

(65) Prior Publication Data

US 2020/0002127 A1 Jan. 2, 2020

(30) Foreign Application Priority Data

Mar. 15, 2017 (EP) .................................... 17161196

(51) Int. Cl.
*B66B 5/00* (2006.01)
*B66B 5/02* (2006.01)
*B66B 1/34* (2006.01)

(52) U.S. Cl.
CPC .......... *B66B 5/0031* (2013.01); *B66B 1/3461* (2013.01); *B66B 5/0037* (2013.01); *B66B 5/02* (2013.01)

(58) Field of Classification Search
CPC .................... B66B 5/00; B66B 5/0006; B66B 5/0018–0037; B66B 5/0087;
(Continued)

(56) References Cited

U.S. PATENT DOCUMENTS 8,464,841 B2 * 6/2013 Birrer .................. B66B 1/3492 187/305
8,532,955 B2 * 9/2013 Tang .................... G11B 19/042 360/75

(Continued)

FOREIGN PATENT DOCUMENTS

EP 1353868 B1 12/2006
EP 2549295 A2 1/2013

(Continued)

*Primary Examiner* — Christopher Uhlir
(74) *Attorney, Agent, or Firm* — William J. Clemens; Shumaker, Loop & Kendrick, LLP

(57) ABSTRACT

A method and a device monitor operating parameters in a passenger transport installation, such as an elevator or an escalator, having a plurality of sensors detecting different operating parameters and a signal processing device. The method steps include: repeatedly detecting a first operating parameter with a first of the sensors; triggering a second of the sensors as soon as the first operating parameter assumes a predetermined trigger characteristic; detecting a second operating parameter with the second sensor and transmitting a signal reproducing the detected second operating parameter to the signal processing device in response to the triggering; and processing the signal in the signal processing device or an external monitoring device for monitoring the second operating parameter. The method and device reduce a data processing amount and/or a data transmission amount, reduce a need for wiring and achieve complex sensor functions with the simple sensors that cooperate with one another.

17 Claims, 2 Drawing Sheets

(58) Field of Classification Search
CPC ........... B66B 5/0093; B66B 5/02; B66B 5/04; B66B 5/06
See application file for complete search history.

(56) References Cited

U.S. PATENT DOCUMENTS

| | | | | |
|---|---|---|---|---|
| 9,376,289 | B2 * | 6/2016 | Herkel | B66B 1/3423 |
| 10,266,372 | B2 * | 4/2019 | Fauconnet | H04Q 9/00 |
| 2014/0008152 | A1 * | 1/2014 | Annen | B66B 5/0025 187/247 |
| 2015/0293799 | A1 * | 10/2015 | Sekine | G05B 23/02 714/37 |
| 2015/0321879 | A1 * | 11/2015 | Martin | B66B 1/36 187/394 |

FOREIGN PATENT DOCUMENTS

| | | | |
|---|---|---|---|
| EP | 3075692 | A1 | 10/2016 |
| WO | 2017028919 | A1 | 2/2017 |

* cited by examiner

METHOD AND DEVICE FOR MONITORING OPERATING PARAMETERS IN A PASSENGER TRANSPORT INSTALLATION

FIELD

The present invention relates to a method and a device for monitoring operating parameters in a passenger transport installation. The invention further relates to a correspondingly equipped passenger transport installation and a method for retrofitting a passenger transport installation. In particular, the invention relates to possibilities for efficiently monitoring operating parameters in a passenger transport installation remotely.

BACKGROUND

Passenger transport installations such as elevators, escalators or moving walkways are used to transport people and/or goods in a building or structure from one place to another. The passenger transport installation as a whole is permanently installed in the structure, but has components such as an elevator car that can move between floors or a conveyor staircase or conveyor platform that can be moved in a circulating manner, by means of which, for example, passengers can be transported.

In order to be able to identify operating states of the passenger transport installation and in particular any anomalies in such operating states, it may be possible to monitor operating parameters of the passenger transport installation continuously or repeatedly at specific time intervals. For example, it may be necessary to know a current operating state in order to be able to control or regulate it appropriately. It may also be advantageous or necessary to detect anomalies in the operating conditions at an early stage, in order to take measures to remedy these if necessary.

For example, in an elevator, it may be advantageous to monitor whether elevator car doors are opening and closing correctly, as anomalies with regard to such a closing function of the doors may impair both elevator safety and passenger comfort. For example, incorrectly-closing elevator car doors can lead to the risk of passengers being injured by the door or by an elevator car starting despite an incorrectly closed door. Alternatively, an incorrectly moving elevator car door can cause inconveniences such as disturbing noises.

Similarly, in an escalator or moving walkway, incorrect movement of steps or pallets may present hazards or at least inconveniences, such as noise, to passengers.

In order to detect operating conditions, a large number of different operating parameters can be monitored in a passenger transport installation. An operating parameter can be a physical variable which is present during operation of the passenger transport installation and which possibly changes during operation of the passenger transport installation. In conventional passenger transport installations, the operating parameters are usually monitored using components already integrated into the passenger transport installation by the manufacturer. For example, the operating parameters can be monitored by monitoring control variables of a control system controlling the passenger transport installation, in particular with regard to possible anomalies. Alternatively or additionally, sensors may be provided in the passenger transport installation, by means of which sensors operating parameters to be monitored can be measured.

Operating parameters may be, for example, currently flowing or averaged electrical currents to building components such as electric motors or actuators in the passenger transport installation, noise in or adjacent to the passenger transport installation, current accelerations within components of the passenger transport installation, temperatures in or adjacent to components of the passenger transport installation, etc.

In particular in the case of older passenger transport installations, it may be necessary or desirable to modernize these installations with regard to the safety, reliability and/or comfort thereof. In this case, it may be desirable, inter alia, to retrospectively create technical conditions in order to be able to monitor specific operating parameters. For example, a device can be retrofitted into an existing passenger transport installation which has, for example, a large number of sensors and a signal processing device for processing signals from the sensors, so that operating parameters can be monitored using this device and, for example, possible anomalies can be identified at an early stage.

Regardless of whether operating parameters are to be monitored using components already provided by the manufacturer in a passenger transport installation or using retrofitted components, it has hitherto been customary to measure the operating parameters using sensors or other components which have been operated and/or evaluated in a centrally controlled manner. A central monitoring unit was able to receive and process signals from each of the large number of sensors. It was generally intended either that the sensors repeatedly transmit signals to the monitoring unit continuously or at short intervals or that the monitoring unit selectively trigger, i.e. instruct, one of the sensors to measure the operating variable to be monitored thereby and to transmit a corresponding measurement signal to the monitoring unit.

For example, EP 1353868 B1 describes a method for monitoring the state of the door mechanism of an elevator and determining a need for maintenance.

However, it has been recognized that conventional approaches for monitoring operating parameters of a passenger transport installation often place high demands on the monitoring unit and/or data communication between the monitoring unit and, for example, the sensors.

There may be a need, inter alia, for a method and a device for monitoring operating parameters of a passenger transport installation, which method and device reduce such demands. In particular, there may be a need to be able to use simple and/or cost-effective components such as sensors and/or data transmission technology in such a method or in such a device, preferably without reducing the quality of monitoring the operating parameters. Furthermore, there may be a need for a suitably equipped passenger transport installation and a method for retrofitting a passenger transport installation.

SUMMARY

According to one aspect of the invention, a method for monitoring operating parameters in a passenger transport installation is proposed. The passenger transport installation has in this case a plurality of sensors detecting different operating parameters as well as a signal processing device. The method comprises the following steps, preferably in the order given: a first operating parameter is repeatedly detected by means of a first of the sensors; a second of the sensors is triggered as soon as the first operating parameter detected by the first sensor assumes a predetermined trigger characteristic; a second operating parameter is detected by means of the second sensor and a signal reproducing the detected second operating parameter is transmitted to the signal processing device in response to the triggering; finally, the signal is processed, for example, in the signal processing device for monitoring the second operating parameter.

According to a second aspect of the invention, a device for monitoring operating parameters in a passenger transport installation is proposed. In this case, the device is designed to be installed in the passenger transport installation, and has a plurality of sensors detecting different operating parameters as well as a signal processing device. The device is designed to carry out a method according to an embodiment of the first aspect of the invention.

According to a third aspect of the invention, a passenger transport installation is proposed which has a device according to an embodiment of the second aspect of the invention.

According to a fourth aspect of the invention, a method for retrofitting a passenger transport installation is proposed, in which the passenger transport installation is equipped with a device according to an embodiment of the second aspect of the invention.

Possible features and advantages of embodiments of the invention may be considered, inter alia and without limiting the invention, to be based on the concepts and findings described below.

As already noted in the introductory part, technical approaches have been developed to monitor operating states of a passenger transport installation. For example, different operating parameters were repeatedly detected on or in the passenger transport installation using various sensors, and information was derived therefrom regarding the current operating status of said installation. This information could be used, for example, to remotely monitor the passenger transport installation (so-called "remote controlling") and/or optionally to be able to introduce appropriate measures if anomalies occur.

In previous approaches, the sensors transmitted their sensor data continuously or at short intervals to a signal processing device, meaning that this signal processing device had to centrally process large amounts of transmitted sensor data. Alternatively, the signal processing device could centrally control each of the sensors individually in order to cause (i.e. to trigger) said sensor to generate sensor data relating to the operating parameter to be detected thereby and to forward said data to the signal processing device.

Such central data processing and/or central control (i.e. central triggering) of various sensors distributed over the passenger transport installation can lead to high data processing outlay or significant effort to control the various sensors. This may require the signal processing device to be equipped with a relatively powerful processor unit, since there may be data processing bottlenecks otherwise. On the other hand, there may be a high data transfer volume between the signal processing device and the sensors. In particular if the sensors communicate with the signal processing device via a common bus system, this may require the bus system to be designed for a high data transmission rate, since there may be data transmission bottlenecks otherwise.

In particular in order to overcome this problem, it is proposed that, in a passenger transport installation equipped with a large number of different sensors, these sensors do not permanently measure their operating parameters to be monitored or that at least corresponding signals are not permanently transmitted to the signal processing device and processed there. Instead, it is proposed that such measurement of operating parameters or transmission of signals be carried out only if this was caused specifically by means of triggering. In this way, requirements for data processing and/or data transmission can be significantly reduced.

In this case, it is in particular proposed to not necessarily perform the triggering centrally from the signal processing device. Instead, the triggering of a sensor is to be initiated directly or indirectly by another sensor. The other sensor may be configured to monitor another operating parameter and to trigger the sensor to be triggered only when said other operating parameter assumes a predetermined trigger characteristic.

In other words, sensors should no longer necessarily be instructed centrally by the signal processing device to detect the operating parameters to be monitored thereby and/or to transmit said parameters to the signal processing device, and/or the signal processing device no longer needs to centrally decide whether or when transmitted monitored operating parameters should be analyzed. Instead, triggering of the detection of the operating parameters and/or a corresponding signal transmission or analysis of transmitted data is to be initiated remotely using further sensors.

Such a remotely initiated triggering can, for example, prevent a bus system used for data transmission from being permanently loaded with a data flow and/or the signal processing device from having to analyze permanently transmitted data, even though, for example, no relevant event has currently occurred which would make detecting and transmitting operating parameters appear necessary. Triggering initiated remotely using further sensors can therefore help prevent data processing bottlenecks and/or data transmission bottlenecks.

The operating parameters to be monitored may be various operating parameters that allow conclusions to be drawn in a passenger transport installation as to the current operating state thereof. For example, such operating parameters may be accelerations acting locally on components of the passenger transport installation, such as an entire car of an elevator, a door of a car of an elevator, or the conveyor unit of an escalator. Temporary acceleration that is measured in the context of the method described herein allows, for example, conclusions to be drawn as to current movements of said components. Monitoring other operating parameters may comprise, for example, measuring locally prevailing temperatures, locally produced noises, locally occurring electrical, magnetic or other fields, etc. Information regarding electrical currents toward drive components, for example, in a passenger transport installation may be obtained in particular by measuring electric or magnetic fields.

The first operating parameter to be detected by the first sensor can preferably be selected such that it can be detected by the sensor using a technically simply configured sensor system. Alternatively or additionally, the first operating parameter may be selected such that sensor data reproducing said parameter require a low data volume per measuring process (for example less than 10 bytes or less than 2 bytes), thus simplifying both corresponding data analysis and data transmission.

For example, the first operating parameter may be an easily measured volume of a noise prevailing locally in the passenger transport installation. Alternatively, the first operating parameter may be a current toward a drive component in the passenger transport installation or an electric or magnetic field produced thereby.

The trigger characteristic which is to be identified when the first operating parameter is detected so that the second sensor is triggered can generally be any characteristic of the detected first operating parameter that is to be uniquely identified. For example, the trigger characteristic may be a threshold value above or below which triggering of the second sensor is to be initiated. Alternatively or additionally, a flank, along which the first operating parameter develops over time, or a slope of such a flank can, for example, serve as a trigger characteristic.

In the example given above, the trigger characteristic may be, for example, a volume threshold to be exceeded or to not be met or a volume development increasing or decreasing with a steep flank. The presence of such a trigger characteristic can be detected relatively easily by means of a simple sensor, for example in the form of a simple microphone.

Alternatively, more complex properties of a monitored first operating parameter can be monitored for the presence of a trigger characteristic. In the example mentioned, for example, the spectrum of a detected sound could be examined for the presence of a specific spectral component, where the spectral component could be typical for specific sounds such as squeaking, for example.

The second operating parameter to be detected can be any operating parameter that differs from the first operating parameter. It may be advantageous to select the first and second operating parameters such that the second operating parameter is technically more complex and/or more difficult to measure than the first operating parameter. On the other hand, it can also be advantageous for the second operating parameter to be able to give a more meaningful conclusion as to the current operating state of the passenger transport installation than the first operating parameter.

The second operating parameter can in principle be transmitted to the signal processing device in any desired manner. For example, signal or data transmission can take place via a hard-wired network or via a wireless network. In particular, transmission can take place via a bus system, via which in general a substantially arbitrarily large number of sensors can communicate with one another as well as with the signal processing device. The first operating parameter detected by the first sensor can also be transmitted to the signal processing device in an identical or a similar manner.

Various advantages can be achieved using the described monitoring method and a correspondingly configured monitoring device. In particular, a function of sensors within a passenger transport installation can be controlled at least partially remotely. This can significantly reduce an amount of data to be transmitted or data to be processed. In this case, technically simple first sensors can, for example, be used to trigger possibly more complex second sensors or to trigger the signal processing device to process sensor data of said second sensors. In other words, a transmission of sensor data of the second operating parameter to the signal processing device and processing of this sensor data can be reduced by such sensor data being generated, transmitted and/or processed only when this has been triggered by the first sensor upon detection of the trigger characteristic in the first operating parameter. Although each of the first and second sensors can be relatively simple in their construction, they can simulate for example a more complex sensor system overall as a result, in which various operating parameters are monitored and, for example, the monitoring of other operating parameters is triggered when predefined trigger characteristics are achieved. The signal processing device can process the signal reproducing the second operating parameter in a variety of ways. For example, filtering or statistical characteristic values such as averaging and/or determining minimum values, maximum values and/or standard deviation may be carried out. The processing can also consist only in forwarding the signal to another device.

In order to monitor a car door of an elevator car of an elevator installation, a current sensor, an acceleration sensor and a microphone are installed in a car door sensor arrangement, for example. The current sensor is connected to the main power supply to the car door. The current sensor acting as the first sensor in this case can detect whether the car door is currently starting to be opened or closed on the basis of prevailing current signal patterns which were predetermined in this case as a trigger characteristic. If such a trigger characteristic is detected, a first trigger signal is output and transmitted to the acceleration sensor and/or the microphone, which act as second sensors in this case. These then begin to monitor whether the car door is accelerated in a manner that is typical for opening or closing and/or whether typical noises are produced. Corresponding signals are transmitted from the acceleration sensor and/or the microphone to the signal processing device. The triggering can either activate the subsequent second sensors to take measurements of the operating parameters to be detected thereby, or activate processing or analysis of continuously recorded operating parameters, for example until the triggering is deactivated again or a deactivating second trigger signal is transmitted. The signals can be transmitted, possibly after previous processing, from a signal processing device to an external monitoring device. If atypical operating parameters are detected in the signals which indicate, for example, excessively slow acceleration of the car door or unusual noise, this can be identified as a malfunction of the car door.

In the example of a passenger transport installation in the form of an escalator, a first sensor in the form of a current sensor can identify, for example, when a main power supply to a drive unit increases significantly, in order to transition from a slow speed to a rapid speed, for example. The first sensor may then trigger an acceleration sensor and/or a microphone as second sensors to measure, for example, accelerations or noises that can be used to track whether the transition to the more rapid speed is carried out properly or, for example, whether there are delays or unusual noises due to malfunctioning.

According to one embodiment, the proposed method further comprises transmission of the processed signal to a monitoring device that is remote from the passenger transport installation. For the proposed device, this means that the signal processing device can be configured to transmit signals to a monitoring device that is remote from the passenger transport installation.

In other words, the signals transmitted to the signal processing device relating to the second operating parameters can be processed in the signal processing device at least in part and then forwarded to an external monitoring device. The monitoring device can be located outside the passenger transport installation, in particular outside of the building accommodating the passenger transport installation. For example, the monitoring device may be part of a monitoring center set up by a manufacturer of the passenger transport installation. In this way, operating states of the passenger transport installation can be monitored remotely in the monitoring device on the basis of the transmitted operating parameters and, if necessary, suitable measures can be taken when anomalies occur. A data volume to be transmitted or a data amount to be processed can be kept low due to the remote triggering of the second sensors.

According to one embodiment of the proposed method, the first sensor can transmit a trigger signal directly to the second sensor in order to trigger the second sensor. Accordingly, in one embodiment of the proposed device, several or all of the plurality of sensors may be configured to transmit signals, in particular trigger signals, to others of the plurality of sensors.

In other words, a triggering of a second sensor and thus a detection of the second operating parameter can be initiated by a first sensor detecting the presence of the predetermined trigger characteristic in the first operating parameter detected thereby and then transmitting a signal directly to the second sensor in order to trigger said second sensor. In such a configuration, triggering of the second sensor does not necessarily require data transmission from the first sensor to the signal processing device. Instead, it may be sufficient for the first sensor to communicate directly with the second sensor in order to trigger said second sensor. As a result, data transmission amounts, data processing amounts and/or reaction times, i.e. times until the second sensor is actually triggered after the detection of a trigger characteristic, can be reduced. The first and the second sensor can advantageously communicate via a network or a data bus to which they are both connected.

Alternatively, according to one embodiment of the proposed method, the first sensor can transmit a signal reproducing the detected first operating parameter to the second sensor. In this case, not the first, but the second sensor detects the presence of the predetermined trigger characteristic and generates a trigger signal in response thereto. The trigger signal is an internal signal within the second sensor.

In this configuration, data transmission from the first sensor to the signal processing device is not necessary for triggering the second sensor either.

Alternatively, according to one embodiment of the proposed method, the first sensor can, in order to trigger the second sensor, transmit a trigger signal to the signal processing system and then the signal processing system can transmit a trigger signal to the second sensor. For one embodiment of the proposed device, this means that several or all of the plurality of sensors may be configured to transmit signals to the signal processing device.

In other words, instead of the first sensor directly triggering the second sensor without the interconnection of other components, it may be provided that the first sensor does not transmit its trigger signal directly to the second sensor, but instead to the signal processing device. The signal processing device can then forward this trigger signal to the second sensor. In such a configuration, the signal processing device is able, for example, to still have an influence itself on the triggering of the second sensor, for example after the trigger signal transmitted by the first sensor has been analyzed and/or processed. While the sensors themselves are usually technically simple and in particular have no or at most a low individual signal processing ability, but for example always emit the trigger signal upon achieving the trigger characteristic, interconnecting the signal processing device can therefore make it possible to forward the emitted trigger signal either unfiltered to the second sensor or to process said signal in the signal processing device in advance. In this way, the signal processing device is able, for example, to compare the trigger signal with signals from other sensors and to decide, for example, according to the situation, whether the second sensor should actually be triggered.

According to one embodiment of the method proposed herein, the second sensor is triggered for the first time as soon as the first operating parameter detected by the first sensor assumes a predetermined first trigger characteristic. The second sensor repeatedly detects the second operating parameter and the signal reproducing the detected second operating parameter is transmitted to the signal processing device in response to the first triggering until the first operating parameter detected by the first sensor assumes a predetermined second trigger characteristic and then a second triggering signal is transmitted to the second sensor.

In other words, not only can the first sensor generate a first trigger signal to cause the second sensor to measure the second operating parameter, but the second sensor can repeatedly measure the second operating parameter until it receives a second trigger signal from the first sensor, which causes it to end the repeated measuring process.

The first and the second trigger signal can be emitted in response to the detection of a first and a second trigger characteristic, respectively. In principle, the two trigger characteristics can be identical, i.e. the first trigger signal is initiated the first time the trigger characteristic is identified, and the second trigger signal is then initiated when the same trigger characteristic is subsequently identified. Preferably, however, the two trigger characteristics are different from one another. For example, the first and second trigger characteristics may be two different threshold values with respect to the observed first operating parameter.

For example, referring to the above example, the first trigger signal may be generated when a detected volume exceeds a first threshold value. Subsequently, the second trigger signal can be generated when the detected volume falls below the first or a second threshold value again. In this case, the first sensor can be used to remotely control or trigger a function of the second sensor. In particular, a start and an end of a measuring operation of the second sensor can be triggered.

According to one embodiment of the method proposed herein, a sensor repeatedly detects the operating parameter to be detected thereby over a period of time and then determines the trigger characteristic for subsequent detection processes. With respect to the device proposed herein, this means that a sensor may be configured to repeatedly detect the operating parameter to be detected thereby over a specific period of time and then to predetermine the trigger characteristic for subsequent detection processes.

In other words, a specific learning function can be implemented in one of the sensors of the passenger transport installation. The learning function can be used to ensure that the trigger characteristic, for which the operating parameter monitored by the sensor is monitored, and upon achieving which the trigger signal is initiated, does not necessarily have to be permanently preset. Instead, the sensor can itself set or establish this trigger characteristic as part of its learning function. For this purpose, the sensor can first observe the operating parameter to be detected thereby over a certain period of time, i.e. repeatedly detect the operating parameters, and then determine the trigger characteristic based on this observation. Due to this learning function, the sensor can adapt its properties at least in part to currently prevailing conditions.

For example, a microphone used as the first sensor can first monitor ambient noise over a specific period of time. If during this period of time it can be assumed that the passenger transport installation is in the normal state, one or more threshold values can then be established, based on the observed noise at maximum volume, which can be defined as a trigger characteristic. If significantly louder noises are detected in the subsequent operation of the first sensor, this can lead to the triggering of a second sensor. In this case, it can be assumed, for example, that the particularly loud noises were generated due to a disturbance such as, for example, the squeaking of components of the passenger transport installation rubbing against one another. This can be interpreted as grounds to measure second operating parameters which, for example, can allow a more precise conclusion to be drawn as to the disturbance.

According to one embodiment, several or even all of the sensors may be configured to detect only one type of operating parameter.

In other words, the sensors contained in the device for the passenger transport installation may be relatively simple sensors that merely need to be configured to measure a single type of operating parameter. Owing to the resulting low complexity of the respective sensors, the costs thereof can be reduced and/or the reliability thereof can be improved. Due to the fact that different sensors can communicate with one another and in particular can trigger one another, complex sensor arrangements can nevertheless be produced by means of which various operating parameters can be detected and monitored according to the situation.

It should be noted that some of the possible features and advantages of the invention are described herein with reference to different embodiments, in particular with reference to a method according to the invention or with reference to a device according to the invention for monitoring operating parameters in a passenger transport installation. A person skilled in the art recognizes that the features may be combined, adapted, transferred or exchanged as appropriate in order to yield other embodiments of the invention.

Embodiments of the invention will be described in the following with reference to the accompanying drawings, with neither the drawings nor the description being intended to be interpreted as limiting the invention.

The drawings are merely schematic and not to scale. Like reference signs refer to like or equivalent features in the various drawings.

DETAILED DESCRIPTION

Figure 1:
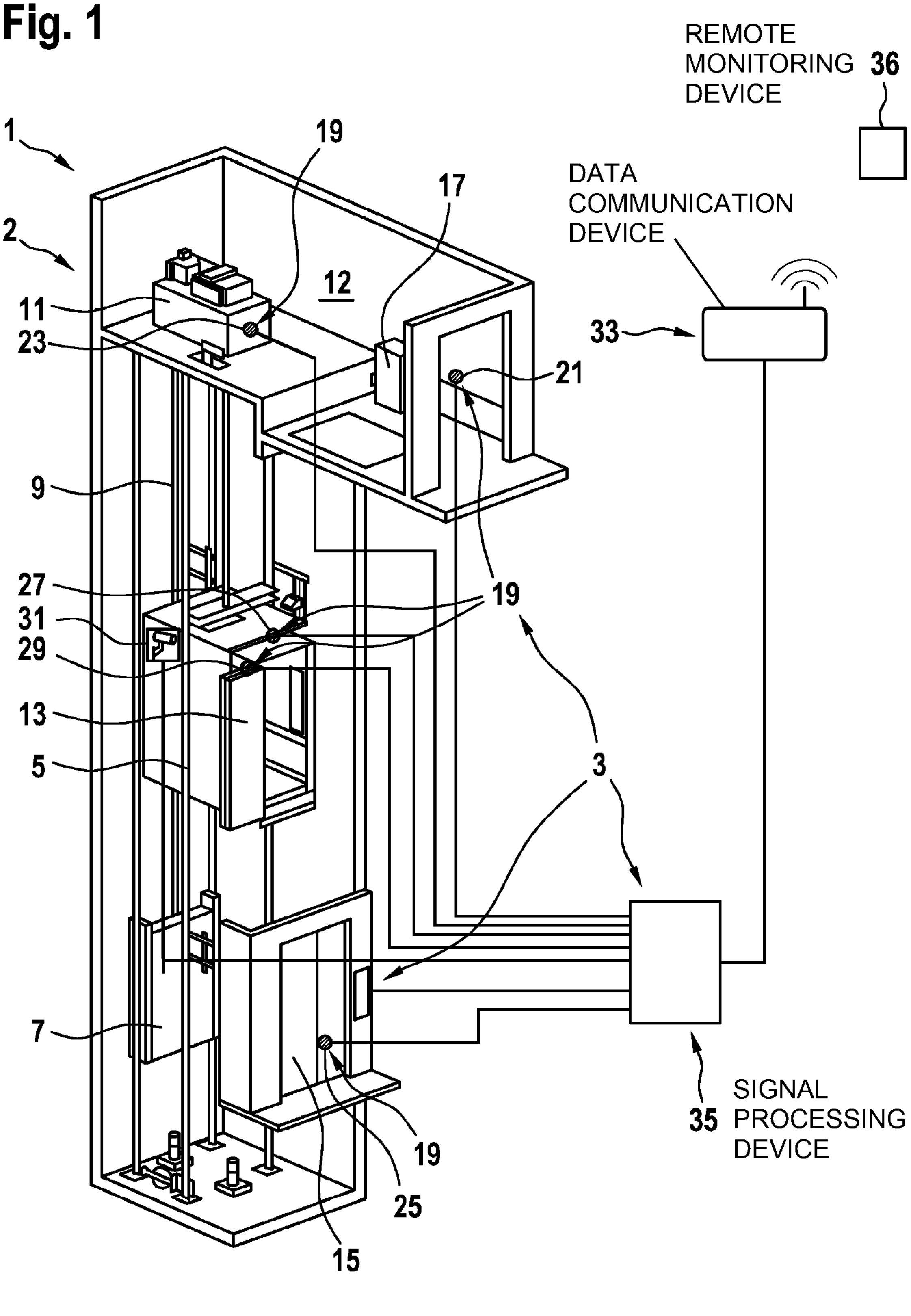
FIG. 1 shows a passenger transport installation in the form of an elevator having a device according to the invention for monitoring operating parameters.

FIG. 1 shows a passenger transport installation 1 in the form of an elevator installation 2. The elevator installation 2 comprises an elevator car 5 and a counterweight 7, which can both be moved in an elevator shaft by means of cables or belts 9 which are driven by a drive machine 11 in an engine room 12. The elevator car 5 has a car door 13. Furthermore, a plurality of shaft doors 15 are provided on the elevator shaft. Operation of the elevator installation 2 and in particular the drive machine 11 and the car door 13 and the shaft doors 15 is controlled by means of an elevator control unit 17.

In order to be able to recognize currently prevailing operating states in the elevator installation 2 and in particular to be able to detect anomalies therein, a plurality of sensor arrangements 19 are distributed over the elevator installation 2. The sensor arrangements 19 are designed to detect specific operating parameters in the elevator installation 2.

For example, a drive machine sensor arrangement 23 can be arranged on the drive machine 11. This may include sensors, for example, by means of which electrical current flows supplied to the drive machine 11, accelerations acting on the drive machine 11, for example in the form of vibrations, temperatures prevailing at the drive machine 11, noise produced at the drive machine 11 and/or electrical and/or magnetic fields prevailing close to the drive machine 11 etc. can be measured.

Furthermore, an elevator car sensor arrangement 27 can be arranged on the elevator car 5. This can detect, for example, acceleration acting on the elevator car 5, noises produced there, temperatures or fields prevailing there, etc. The elevator car sensor arrangement 27 can further comprise a camera arrangement 31 by means of which, for example, an inner space in the elevator car 5 can be observed.

Furthermore, a car door sensor arrangement 29 can be arranged on the car door 13. This can measure, for example, acceleration acting on the car door 13, noises produced there, etc.

A shaft door sensor arrangement 25 may be arranged on each shaft door 15. This arrangement can detect, for example, acceleration acting on the shaft door 15, noises produced there, etc.

An engine room door sensor arrangement 21 can be provided at an entrance to the engine room 12, using which arrangement a closure state of an engine room door, noises produced there, etc. can be measured.

The various sensor arrangements 19 can transmit signals containing information about the operating parameters detected thereby to a signal processing device 35. There, the signals can be processed and/or evaluated. The sensors contained in the various sensor arrangements 19 form, together with the signal processing device 35, a device 3 for monitoring operating parameters in the elevator installation 2.

Optionally, the received signals can be sent to a remote monitoring device 36 via a data communication device 33 before or after being processed or evaluated. The monitoring device 36 may, for example, be set up in a monitoring center in which, for example, the manufacturer of the passenger transport installation can monitor its function remotely.

Data or signal transmission between the sensors and the signal processing device 35 as well as from the signal processing device 35 via the data communication device 33 to the monitoring device 36 can take place via a wired connection or wirelessly.

In conventional passenger transport installations 1, the many sensor arrangements 19 contained therein generally supply signals or sensor data on a permanent basis to the signal processing device 35 or have to be centrally controlled by said device. This requires both a high data processing outlay in the signal processing device 35 and a high data transmission amount between the sensor arrangements 19 and the signal processing device 35.

It is therefore proposed that the individual sensor arrangements 19 should, in principle, be able to transmit their signals and sensor data to the signal processing device 35, but that this is not permanent; instead, it occurs at least for one or several of the sensors only upon a specific triggering. In this case, the sensor arrangements 19 should be configured such that the sensors contained therein can trigger one another at least in part, i.e. individual sensors can be triggered remotely and without necessary control or intervention by, for example, the signal processing device 35.

Figure 2:
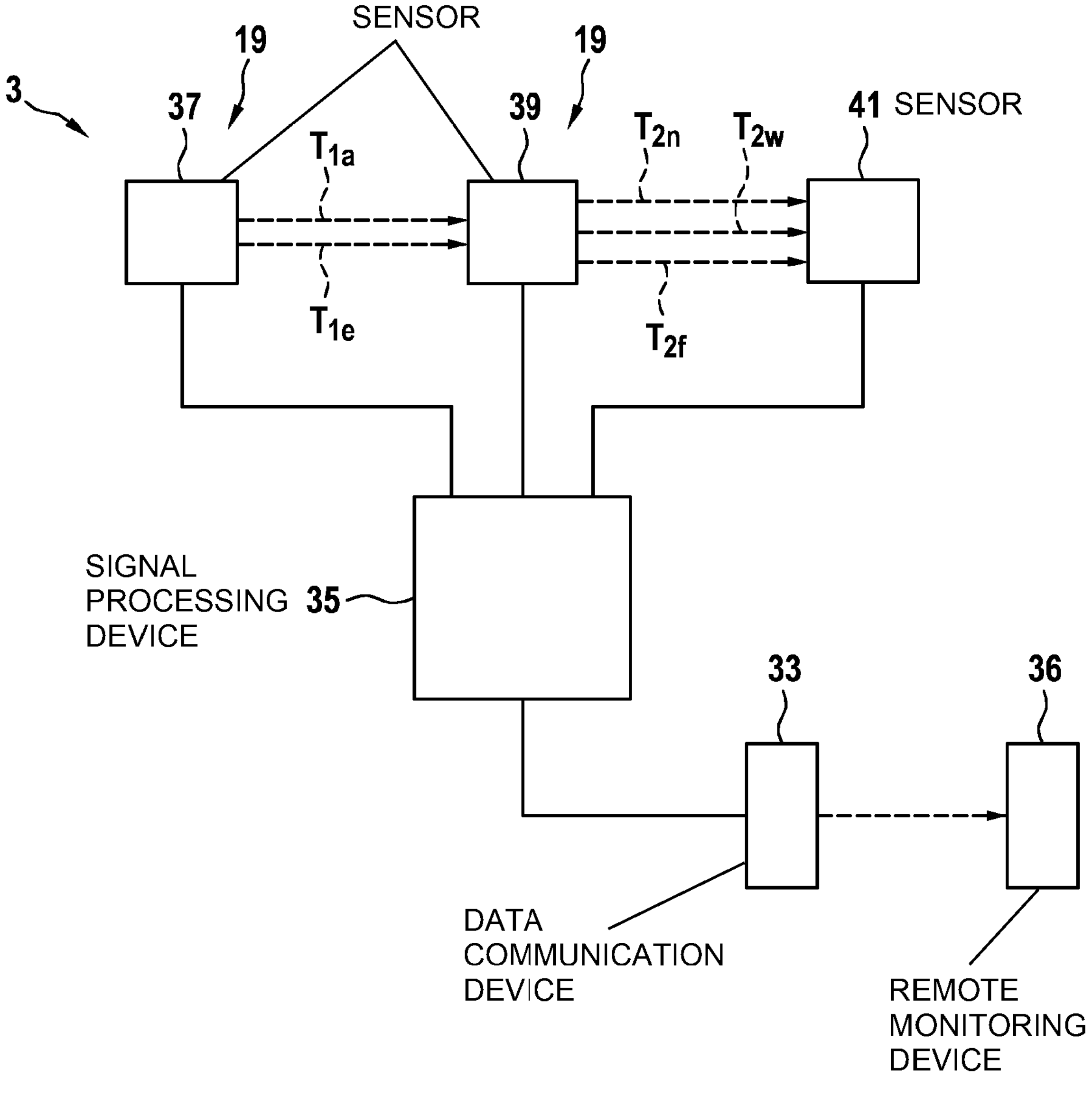
FIG. 2 is a schematic illustration of a device according to the invention for monitoring operating parameters.

FIG. 2 shows a device 3 by means of which operating parameters can be monitored in a passenger transport installation 1 using one or more sensor arrangements 19.

In the example shown, the device 3 comprises three different sensors 37, 39, 41. Each of the sensors 37, 39, 41 is designed to detect at least one operating parameter of the passenger transport installation 1. The various sensors 37, 39, 41 are designed differently and can therefore measure different operating parameters. Specific simple signal processing may already take place in the sensors 37, 39, 41, for example in the form of segmentation, limit value monitoring, etc. The sensors 37, 39, 41 can generate the signals to be provided thereby either continuously, repetitively or in response to an externally initiated triggering.

It is now proposed to repeatedly detect a first operating parameter in a first sensor 37 and to check whether this first operating parameter assumes a predetermined first trigger characteristic, i.e. for example exceeds or falls below a predetermined boundary value or threshold value. If this is the case, the first sensor 37 should generate a first trigger signal $T_{1a}$.

This first trigger signal $T_{1a}$ may be transmitted by the first sensor 37 directly to a second sensor 39, as indicated in FIG. 2 by a dashed arrow. Alternatively, the first trigger signal $T_{1a}$ can be transmitted to the signal processing device 35 and be transmitted therefrom to the second sensor 39 directly or optionally after specific processing.

Only in response to such a first trigger signal $T_{1a}$ does the second sensor 39, in turn, start to detect the second operating parameter to be monitored thereby and to transmit corresponding signals to the signal processing device 35.

Alternatively, it may be provided that the second sensor 39, even without such a first trigger signal $T_{1a}$, detects the operating parameter to be monitored thereby, but does not transmit associated signals permanently to the signal processing device 35, for example, or the signal processing device ignores a corresponding signal transmission until the first trigger signal $T_{1a}$ has been generated by the first sensor 37.

The signal processing device 35 can process the signals received from the second sensor 39 and optionally forward these signals, subsequently or as raw signals, to the external monitoring device 36 via the data communication device 33, so that said monitoring device can draw conclusions as to the current operating state of the passenger transport installation 1 based on these signals.

The second sensor 39 can detect the second operating parameter once in response to the first trigger signal $T_{1a}$ and transmit said parameter to the signal processing device. Alternatively, the second sensor 39 may, in response to the first trigger signal $T_{1a}$, begin to repeatedly or continuously detect the second operating parameter and/or transmit said parameter to the signal processing device. Detecting the second operating parameter may be stopped again in response to a second trigger signal $T_{1e}$ to be output by the first sensor 37. For example, the first sensor 37 can detect when the operating parameter monitored thereby assumes a second trigger characteristic, i.e. for example exceeds or falls below a further threshold value, and then transmits the second trigger signal $T_{1e}$ to the second sensor 39. Alternatively, the detection of the second operating parameter may be ended automatically after a predetermined time. It may also be the case that the second sensor 39 detects the second operating parameter as long as the first trigger signal $T_{1a}$ is transmitted by the first sensor 37 and the detection of the second operating parameter is ended as soon as the first trigger signal $T_{1a}$ is no longer transmitted.

The second sensor 39 may in turn generate trigger signals and transmit them to further sensors 41. For example, the second sensor 39 can detect when the second operating parameter monitored thereby assumes a trigger characteristic or one of a large number of possible trigger characteristics. The second sensor 39 can then output corresponding trigger signals $T_{2n}$, $T_{2w}$, $T_{2f}$. These trigger signals can be transmitted to one or more further sensors 41 in order to cause these in turn to become active and to detect operating parameters and transmit said parameters to the signal processing device.

For example, depending on the detected trigger characteristic, the second sensor may output a trigger signal $T_{2n}$, a trigger signal $T_{2w}$ or a trigger signal $T_{2f}$. The trigger signal $T_{2n}$ may indicate that a normal state has been detected in the second operating parameter. The trigger signal $T_{2w}$ may indicate, in the form of a kind of warning, that an anomaly has been detected in the second operating parameter. The trigger signal $T_{2f}$ may indicate that an error has been identified during detection of the second operating parameter. Depending on the received trigger signal $T_{2n}$, $T_{2w}$, $T_{2f}$, the addressed further sensor 41 can react appropriately.

In this way, a kind of sensor chain or sensor network can be formed in which one or more individual sensors 37, 39 can trigger and thereby activate other sensors 39, 41.

Instead of the trigger signals $T_{1a}$ and $T_{1e}$, the first sensor 37 can also continuously transmit a signal reproducing the detected first operating parameter to the second sensor 39. The second sensor 39 then checks itself whether the first operating parameter assumes a predetermined first or second trigger characteristic. If this is the case, the second sensor 39 generates, as described above for the first sensor 37, internal trigger signals, which, as described above, starts or ends detection of the second operating parameter.

Analogously, the second sensor can also continuously transmit a signal reproducing the detected second operating parameter, instead of trigger signals $T_{2n}$, $T_{2w}$ and $T_{2f}$, to further sensors 41 which then evaluate said signal as described.

This is to be explained for application in an elevator installation 2 on the basis of a specific example. In order to monitor a car door 13, a current sensor, an acceleration sensor and a microphone are installed in the car door sensor arrangement 29. The current sensor is connected to the main power supply to the car door 13. The current sensor acting as the first sensor 37 in this case can detect whether the car door 13 is currently starting to be opened or closed on the basis of prevailing current signal patterns which were predetermined in this case as a trigger characteristic. If such a trigger characteristic is detected, a first trigger signal is output and transmitted to the acceleration sensor and/or the microphone, which act as second sensors 39 in this case. These then begin to monitor whether the car door 13 is accelerated in a manner that is typical for opening or closing or whether typical noises are produced. Corresponding signals are transmitted from the acceleration sensor and/or the microphone to the signal processing device 35. The triggering may either activate the subsequent second sensors 39 to take measurements of the operating parameters to be detected thereby, or activate processing or analysis of continuously received operating parameters, for example until the triggering is deactivated again or a deactivating second trigger signal is transmitted. The signals are transmitted, possibly after previous processing, from the signal processing device 35 to the external monitoring device 36. If atypical operating parameters are detected in the signals which indicate, for example, excessively slow acceleration of the car door or unusual noise, this can be identified as a malfunction of the car door 13.

In the example of a passenger transport installation 1 in the form of an escalator, a first sensor 37 in the form of a current sensor can identify, for example, when a main power supply to a drive unit increases significantly, in order to transition from a slow speed to a rapid speed, for example. The first sensor 37 may then trigger one or more second sensors 39 to measure, for example, accelerations or noises that can be used to track whether the transition to the more rapid speed is carried out properly or, for example, whether there are delays or unusual noises due to malfunctioning.

In the applications of the method and device described herein, trigger signals generated by sensors may be made available to all sensors in a network. Further, multiple triggers and/or sensor signals may be combined in order to merge, for example, the functions of a plurality of sensors.

By means of embodiments of the present invention, various advantages can be achieved in comparison with conventional solutions. For example, signals already measured by sensors can be reused within a decentralized sensor network. This can improve performance, reliability and/or efficiency within the sensor network. Furthermore, simple sensors can be combined with one another in order to be able to provide more complex information in the manner of sensor fusion. In addition, signal segmentation can be carried out by means of sensor signals, preferably without connection to, for example, a control system of the passenger transport installation. Overall, operating parameters can be recorded exclusively or in particular during relevant times or relevant events.

The solution proposed herein may make it possible to retrofit existing passenger transport installations with sensors that can detect specific operating conditions, without needing to establish a connection, for example, to a control system of the passenger transport installation. Furthermore, a number of wiring connections can be reduced by reusing signals and trigger signals within the sensor network, in particular due to the unnecessary connection to the control system of the passenger transport installation. Finally, a cost reduction in particular can be achieved, for example by the sensor fusion using a plurality of simple sensors instead of a complex sensor.

In summary, due to the intended remote triggering of individual sensors 39, 41 by other sensors 37, 39, a data processing amount and/or a data transmission amount can be reduced, a need for wiring can be reduced and complex sensor functions can be achieved with the aid of simple sensors 37, 39, 41 which cooperate with one another. This may be advantageous in particular during the retrofitting of existing passenger transport installations 1.

Finally, it should be noted that terms such as "comprising", "having", etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring operating parameters in a passenger transport installation having a plurality of sensors detecting different ones of the operating parameters as well and a signal processing device, the method comprising the steps of:

repeatedly detecting a first of the operating parameters with a first of the sensors;

triggering a second of the sensors only in response to the first operating parameter assuming a predetermined trigger characteristic;

detecting a second of the operating parameters with the second sensor and transmitting a signal reproducing the detected second operating parameter to the signal processing device in response to the triggering; and processing the signal to monitor the second operating parameter; wherein the first sensor is a current sensor connected to a main power supply and the second sensor is an acceleration sensor or a microphone measuring operating parameters of the passenger transport installation.

2. The method according to claim 1 including transmitting the processed signal to a monitoring device that is remote from the passenger transport installation.

3. The method according to claim 1 wherein the first sensor transmits a trigger signal directly to the second sensor thereby triggering the second sensor.

4. The method according to claim 1 wherein the first sensor transmits a signal reproducing the detected first operating parameter to the second sensor and the second sensor responds by generating a trigger signal thereby triggering the second sensor.

5. The method according to claim 1 wherein the first sensor transmits a trigger signal to the signal processing device to trigger the second sensor and then the signal processing device transmits the trigger signal to the second sensor thereby triggering the second sensor.

6. The method according to claim 1 wherein the predetermined trigger characteristic is a predetermined first trigger characteristic, wherein the second sensor is triggered a first time as soon as the first operating parameter assumes the predetermined first trigger characteristic, and wherein the second sensor repeatedly detects the second operating parameter and transmits the signal reproducing the detected second operating parameter to the signal processing device in response to the first time triggering until the first operating parameter detected by the first sensor assumes a predetermined second trigger characteristic and transmits a trigger signal to the second sensor.

7. The method according to claim 1 wherein at least one of the sensors repeatedly detects an associated one of the operating parameters over a period of time and then determines a trigger characteristic for use as the predetermined trigger characteristic in a subsequent detection of the associated one operating parameter.

8. A device for monitoring operating parameters in a passenger transport installation comprising:

a plurality of sensors detecting different ones of the operating parameters;

a signal processing device; and wherein the device is adapted to perform the method according to claim 1.

9. The device according to claim 8 wherein several of the sensors transmit signals to other sensors of the plurality of sensors.

10. The device according to claim 8 wherein several of the sensors transmit signals to the signal processing device.

11. The device according to claim 8 wherein the signal processing device transmits signals to a monitoring device that is remote from the passenger transport installation.

12. The device according to claim 8 wherein at least several of the sensors are adapted to detect only one type of operating parameters.

13. The device according to claim 8 wherein one of the sensors repeatedly detects an associated one of the operating parameters over a period of time and then determines a trigger characteristic for use as the predetermined trigger characteristic in a subsequent detection of the associated one operating parameter.

14. A passenger transport installation including the device according to claim 8.

15. A method for retrofitting a passenger transport installation comprising equipping the passenger transport installation with the device according to claim 8.

16. An elevator passenger transport installation including the device according to claim 8 wherein the plurality of sensors form an elevator car door sensor arrangement with the second sensor measuring operating parameters of the elevator car door.

17. An escalator passenger transport installation including the device according to claim 8 wherein second sensor measures operating parameters of the escalator.

* * * * *